(12) United States Patent
Roach (10) Patent No.: US 8,033,403 B2
(45) Date of Patent: Oct. 11, 2011

(54) ROTATABLE ORGANIZER

(76) Inventor: Brad Roach, Brampton (CA)

( * ) Notice: Subject to any disclaimer, the term of this patent is extended or adjusted under 35 U.S.C. 154(b) by 532 days.

(21) Appl. No.: 12/169,722

(22) Filed: Jul. 9, 2008

(65) Prior Publication Data

US 2010/0006524 A1  Jan. 14, 2010

(51) Int. Cl.
*A47B 73/00* (2006.01)

(52) U.S. Cl. .......................................................... 211/77

(58) Field of Classification Search ............... 211/77, 211/1.52, 78, 121, 1.56, 53, 56, 58, 70, 84, 211/85.18, 131.1, 163, 10, 122; 108/139, 108/103, 22; 312/305, 125, 273, 135, 134; 74/665 A–665 G, 665 GA; 206/135; 248/349.1
See application file for complete search history.

(56) References Cited

U.S. PATENT DOCUMENTS

| | | | |
|---|---|---|---|
| 137,248 A | 3/1873 | Shaw | |
| 176,981 A * | 5/1876 | Morrison | 108/21 |
| 519,630 A | 5/1894 | Hogg | |
| 729,642 A * | 6/1903 | Nash | 108/94 |
| 746,615 A * | 12/1903 | Washburn | 186/42 |
| 1,254,983 A * | 1/1918 | Chadwick | 108/22 |
| 1,347,936 A | 7/1920 | Carroll | |
| 1,731,308 A | 10/1929 | Jordan | |
| 1,917,030 A * | 7/1933 | Gracey | 40/415 |
| 1,961,502 A | 6/1934 | Marengo | |
| 2,058,002 A | 2/1935 | Daum | |
| 2,281,849 A | 5/1942 | McCoppin | |
| 2,852,172 A | 9/1958 | Brown | |
| 2,928,705 A * | 3/1960 | Goldsmith | 312/223.5 |
| 3,093,305 A | 6/1963 | Englund | |
| 3,332,656 A | 7/1967 | Johnson | |
| 3,469,708 A * | 9/1969 | Pennington | 211/1.55 |
| 3,501,016 A | 3/1970 | Eaton | |
| 3,897,063 A | 7/1975 | Lehwalder | |
| 3,992,068 A | 11/1976 | Galton | |
| 4,179,168 A * | 12/1979 | Isaac et al. | 312/125 |
| D263,667 S | 4/1982 | Turcotte | |
| 4,775,055 A | 10/1988 | Morse | |
| 4,793,481 A * | 12/1988 | Randle | 206/315.9 |
| 4,899,968 A * | 2/1990 | Eaglin et al. | 248/131 |
| 5,145,181 A * | 9/1992 | Welman et al. | 273/237 |
| 5,161,698 A * | 11/1992 | Hatouchi et al. | 211/122 |
| 5,209,446 A * | 5/1993 | Kawai | 248/183.2 |
| 5,248,049 A | 9/1993 | Murphy, Sr. | |
| 5,388,729 A | 2/1995 | Gerringer | |

(Continued)

FOREIGN PATENT DOCUMENTS

JP  08045656 A  *  2/1996

(Continued)

*Primary Examiner* — Darnell Jayne
*Assistant Examiner* — Patrick Hawn
(74) *Attorney, Agent, or Firm* — Michael A. Blake (57) ABSTRACT

A rotatable organizer comprises a base and a plurality of gears in rotatable communication with the base. An exposed turntable is fixedly attached to a first gear and another turntable is fixedly attached to a third gear. A second gear is in communication with the first and third gears. A rail is attached to the base and extends up orthogonally with respect to at least one of the turntables and the rail encloses at least a portion of the perimeter of the rotatable organizer. A central divider is located on a plane that contains an imaginary line that extends between the centers of the turntables. The turntables are configured to be rotatable with respect to the base to move items atop the base within the rotatable organizer.

12 Claims, 13 Drawing Sheets

U.S. PATENT DOCUMENTS

| | | | |
|---|---|---|---|
| 5,877,479 A * | 3/1999 | Yu | 219/754 |
| D414,992 S * | 10/1999 | Schmidt | D7/600.2 |
| 6,910,580 B1 | 6/2005 | Frankum | |
| 7,083,070 B2 | 8/2006 | McGuyer | |
| D528,865 S | 9/2006 | Barton | |
| 7,320,415 B2 | 1/2008 | McGuyer | |
| 7,665,244 B2 * | 2/2010 | Jesness, III | 47/39 |
| 7,758,005 B2 * | 7/2010 | Uemura | 248/346.06 |

FOREIGN PATENT DOCUMENTS

| | | |
|---|---|---|
| JP | 09023427 | 2/1997 |
| JP | 2001052853 A * | 2/2001 |

* cited by examiner

ROTATABLE ORGANIZER

TECHNICAL FIELD

This invention relates generally to rotatable organizer, and more particularly to a rotatable organizer that allows one to rotate items on a plurality of turntables, until the item desired is easily accessible.

BACKGROUND

Cabinets and shelves, such as those located in kitchens, basements, and other areas in the home or even office, are used to store items. Often times these cabinets and/or shelves are located above a user's head, thereby making it difficult to see what is inside cabinet or shelf. Furthermore, refrigerator shelves are often cluttered. Organizing items in cabinets, shelves and refrigerators such that a user can easily access them has been a problem for many years.

Lazy Susans and the like have been used to access a plurality of items by rotating the items on some sort of platform. However, Lazy Susans, are circular, and use up space inefficiently; especially in kitchen cabinets and shelves, and many times Lazy Susans will not fit in one's kitchen cabinet or shelf, especially if the cabinet, refrigerator or shelf is deep and narrow. Thus, a user is often relegated to sorting and searching through the myriad of containers in his or her cabinets or shelves until the item desired is found.

Accordingly, there is a need for a rotatable organizer that overcomes these and other disadvantageous.

SUMMARY

The disclosed invention relates to a rotatable organizer comprising: a base; a first gear in rotatable communication with the base; an exposed turntable fixedly attached to the first gear, the exposed turntable having a center; a second gear in rotatable communication with the base, and meshing with the first gear; a third gear in rotatable communication with the base, and meshing with the second gear; a third turntable fixedly attached to the third gear, the third turntable having a center; a rail attached to the base and extending up orthogonally with respect to at least one of the turntables, and wherein the rail encloses at least a portion of the perimeter of the rotatable organizer; a central divider located on a plane that contains an imaginary line that extends from the center of the exposed turntable to the center of the third turntable, the plane being generally orthogonal to the surface of the exposed turntable and the surface of the third turntable; where the exposed turntable and the third turntable are configured to be rotatable with respect to the base.

The disclosed invention also relates to a rotatable organizer comprising: a base; a first grooved wheel in rotatable communication with the base, the first grooved wheel comprising a first groove; an exposed turntable fixedly attached to the first grooved wheel, the exposed turntable having a center; a second grooved wheel in rotatable communication with the base, second grooved wheel comprising a second groove; a second turntable fixedly attached to the second grooved wheel, the second turntable having a center; a belt attached to the first groove and the second groove, and configured to rotate the second grooved wheel when the first grooved wheel rotates; a rail attached to the base and extending up orthogonally to at least one of the turntables, wherein the rail encloses at least a portion of the perimeter of the rotatable organizer; a central divider located on a plane that contains an imaginary line that extends from the center of the exposed turntable to the center of the second turntable, the plane being generally orthogonal to the surface of the exposed turntable and the surface of the second turntable; where the exposed turntable and the second turntable are configured to be rotatable with respect to the base.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
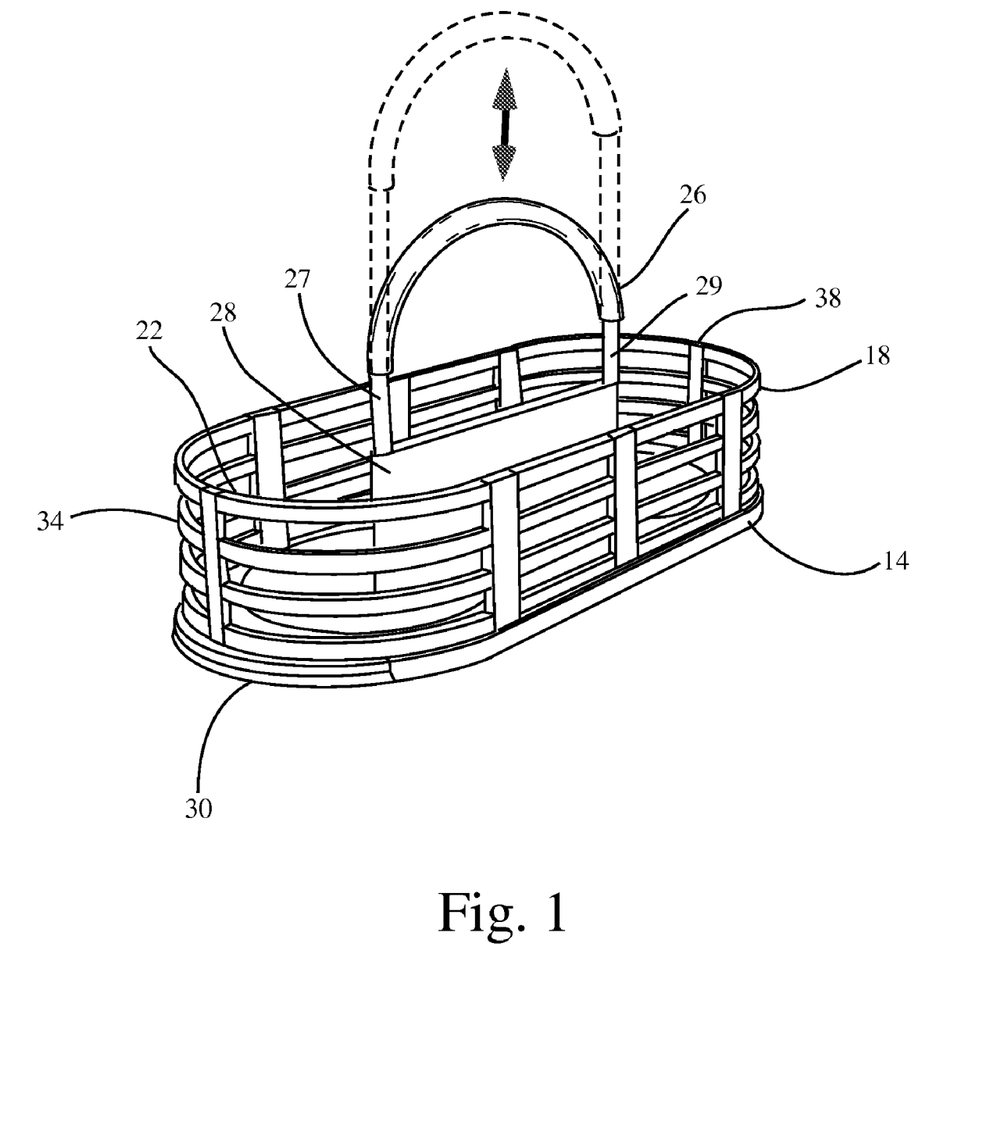
FIG. 1 is perspective view of the disclosed rotatable organizer.

FIG. 1 is a perspective view of the disclosed rotatable organizer 10. The rotatable organizer 10 comprises a base 14, a rail 18 attached to the base 14, an extendible handle 26 is attached to a central divider 28, and an exposed turntable 30 located within the base 14 and on a first end 34 of the organizer 10. The first end 34 and second end 38 may be described as the front end and back end of the organizer, respectively. The extendible handle 26 is shown in a normal configuration, and in an extended configuration (dashed lines). The rail 18 generally encloses a perimeter about the organizer 10. In one embodiment, the rail 18 may comprise an openable gate 22, that allows one to open the rail 18 at the gate 22, to easily access items located in the rotatable organizer 10.

Figure 2:
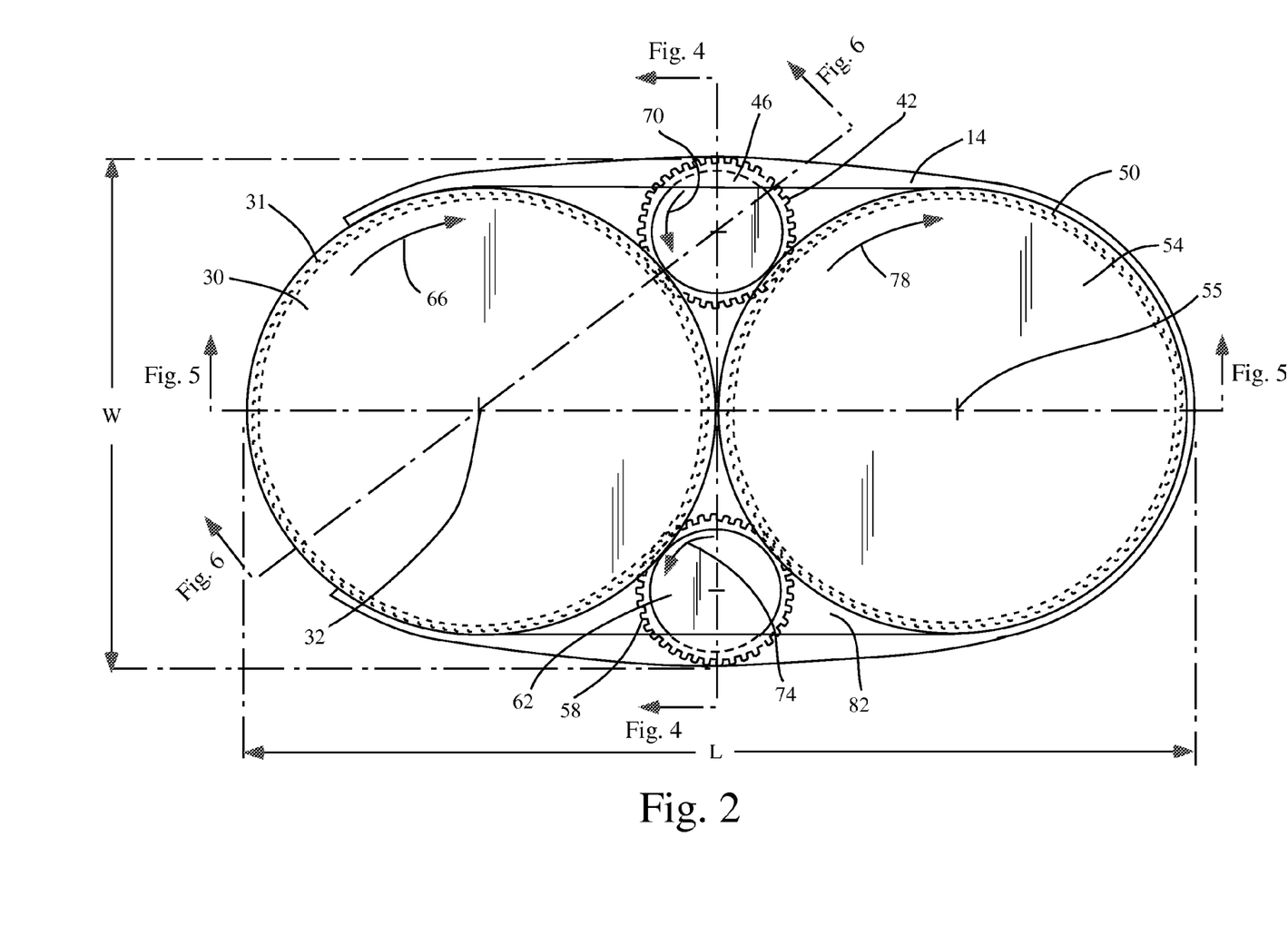
FIG. 2, is a top view of the disclosed rotatable organizer from FIG. 1.

FIG. 2 is a top view of the organizer 10. The exposed turntable 30 is shown. Attached, or manufactured as part of the exposed turntable 30, is a first gear 31. The gear 31 is shown in dotted lines, because the gear 31 is below the surface of the exposed turntable 30, in this view. In addition the first gear has a diameter that is slightly smaller than the diameter of the exposed turntable 30. The first gear 31 and exposed turntable 30 rotate together, with respect to the base 14. The first gear 31 meshes with second gear 42. The second gear 42 is directly attached to a second turntable 46. The second gear 42, and second turntable 46 are rotatably attached to the base 14, that is the second gear 42, and second turntable 46 rotate with respect to the base 14. The diameter of the second gear 42 is slightly larger than the diameter of the second turntable 46. The second gear 42 meshes with third gear 50. Third gear 50 is attached to a third turntable 54 in a manner similar to the way the first gear 31 and the exposed turntable 30 are attached to each other. The third gear 50 and the third turntable 54 are rotatably attached to the base 14. The third gear 50 has a diameter that is slightly less than the diameter of the third turntable 54. The third gear 50 meshes with a fourth gear 58. The fourth gear is attached, or manufactured with, a fourth turntable 62. The fourth gear 58 and fourth turntable 62 are rotatably attached to the base 14. The fourth gear 58 also meshes with the first gear 31. Thus, if the exposed turntable 30 rotates in clockwise fashion, as shown by the arrow 74, the first gear 31 causes the second gear 42 (and second turntable 46) and the fourth gear 58 (and the fourth turntable 62) to both turn counter-clockwise (see the arrows 66, 70), causing the third gear 50 and third turntable 54 to turn clockwise. Similarly, if the exposed turntable 30 is turned counter-clockwise, the third turntable 54 will also turn counter-clockwise. The second and fourth gears 42, 58 are shown in dotted lines, because there is a non-stick or low friction surface 82 that is co-planar with the surfaces of the turntables 30, 46, 54 and 62, and thus hides from view the gears 42, 58. One will note that the second and fourth turntables 46,62 and gears 42,58 are much smaller than the exposed turntable 30, first gear 31, and the second turntable 54 and second gear 50. The non-stick surface 82 is attached to the base 14, and has openings configured to fit around the turntables 30, 46, 54 and 62. The central divider 28 attaches to the center 32 of the exposed turntable 34 and the center 55 of the third turntable 54 via a first pin member 27 and a second pin member 29. The first and second pin members 27, 29 may be attached to the turntables 30, 54 via bushings, or bearings, such that the first and second pin members 27, 29, will not rotate with the turntables, but rather remain non-rotating with respect to the base 14. The pin members 27, 29, and central divider 28 are shown in FIG. 1 but are not shown in FIG. 2. The turntables 30, 54 are configured to each rotate about their centers 32, 55 respectively. In another embodiment, the central divider 28 may be attached directly to the non-stick surface 82, instead of using pins located at the centers of the turntables. The central divider 28 may be described as being located on a plane that contains the imaginary line that extends from the center 32 of the exposed turntable 30 to the center 55 of the third turntable 55, and is generally orthogonal to the surface of the exposed turntable 30 and the surface of the third turntable 55.

The length "L" and width "W" of the organizer 10 is shown in FIG. 2. The length may be any suitable value and the width may be any suitable value. In one embodiment, the length L may be about 5 inches to about 20 inches, and the width may be about 3 inches to about 15 inches, and preferably, the length may be about 13 inches and the width about 7 inches.

Figure 3:
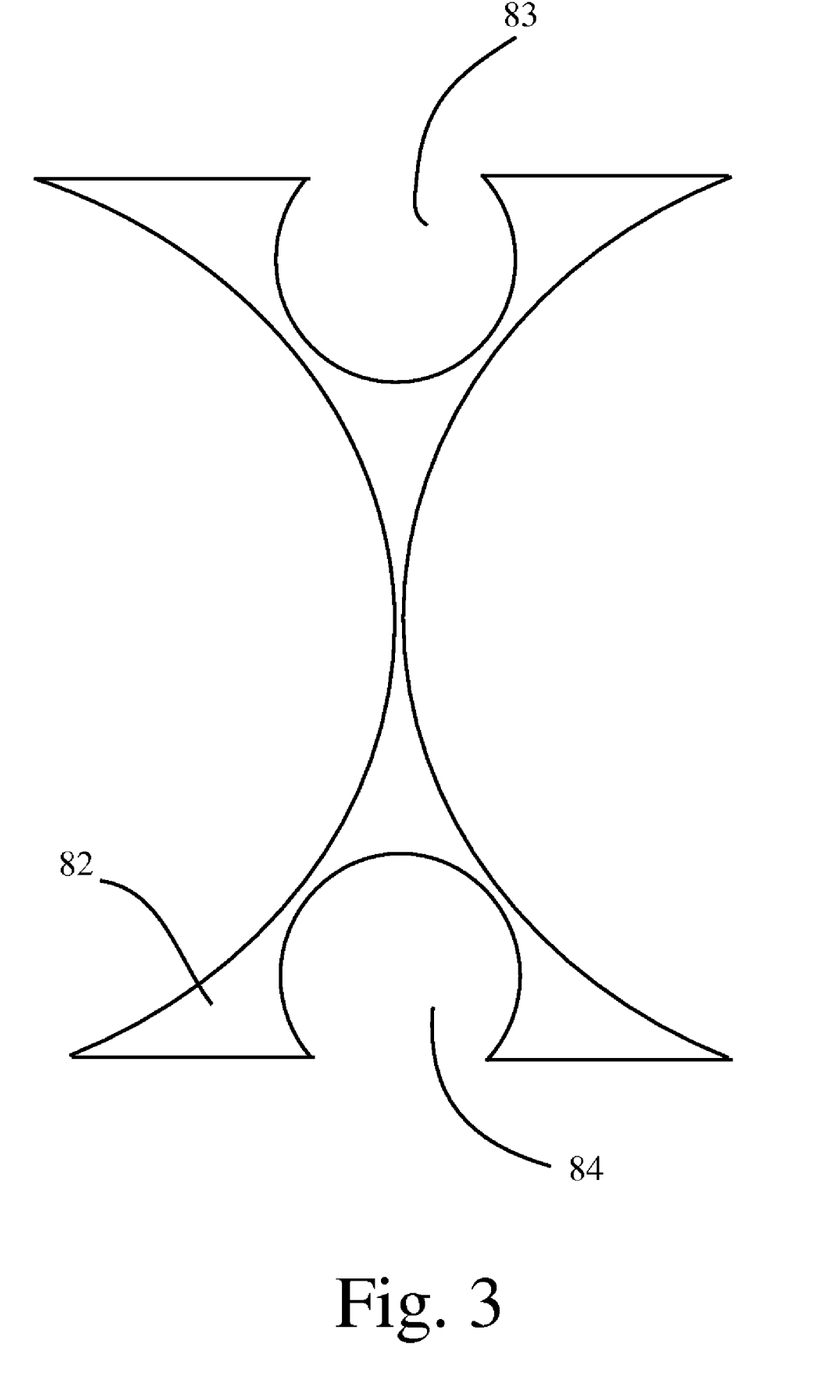
FIG. 3 is a top view of a low friction surface.

FIG. 3 shows the non-stick surface 82 alone. In other embodiments, where there is no second and fourth turntables 46, 62, the circular removed regions 83, 84, may be omitted, or in other words, the non-stick surface 82, will be solid where the circular removed regions 83, 84 were located.

The disclosed invention, includes embodiments where the fourth turntable 62 and gear 52 may be omitted, due to the fact that the second gear 42, may rotate the third turntable 54, without the need of the fourth gear 52. In still other embodiments, the invention may include three or more large gears and turntables (like the first and third gears 31, 50 and turntables 30, 54) which are each in communication with a smaller gear and turntable (like the second and fourth gears 42, 58 and turntables 46, 62)

Figure 4:
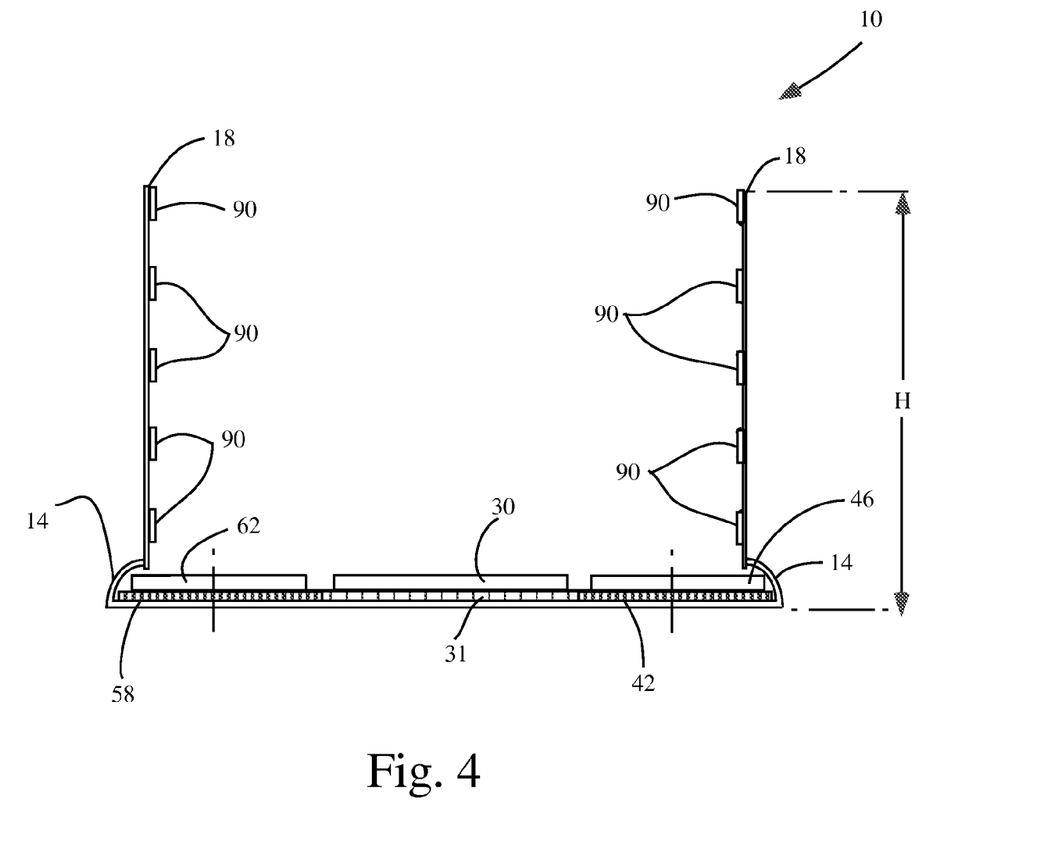
FIG. 4 is a cross-sectional view of the disclosed rotatable organizer from FIG. 2.

FIG. 4 shows a sectional view through plane A-A of the rotatable organizer 10. In this view, the second and fourth turntables 46, 62 are shown in relation to the exposed turntable 30. In this view, it can be seen how the second and fourth gears 42, 58 have diameters greater than the second and fourth turntables 46, 62. The rails 18 are shown attached to the base 14. The rail 18 will have at least one inward surface 90, which faces towards the interior of the organizer 10. The inward surface 90 may have a non-stick surface. The non-stick surface may be selected from any suitable low friction surface, including, but not limited to: rubber, plastic, synthetic plastic, resins, polyvinyl, Teflon, nylon or metal.

Figure 5:
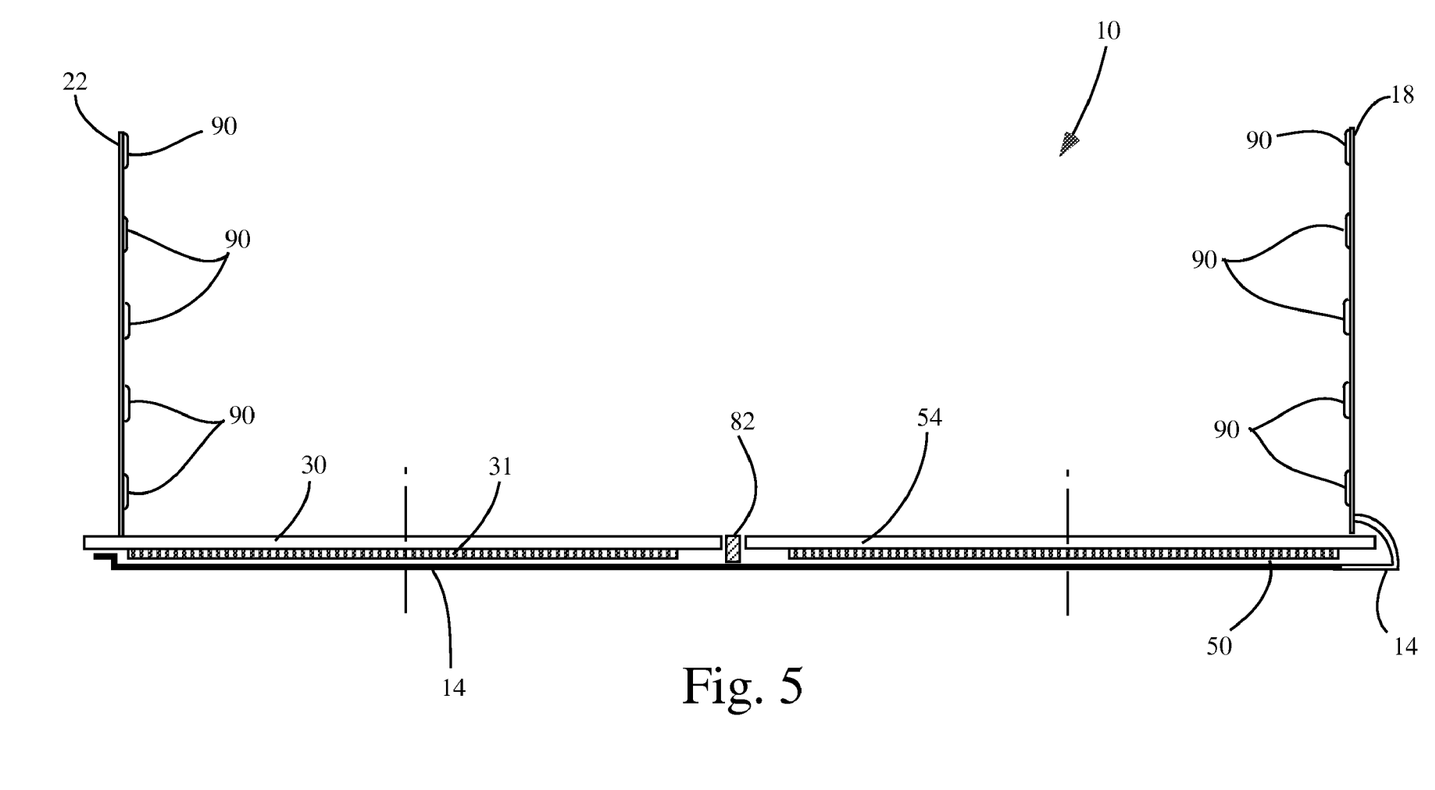
FIG. 5 is a cross-sectional view of the disclosed rotatable organizer from FIG. 4, through a different plane.
Figure 6:
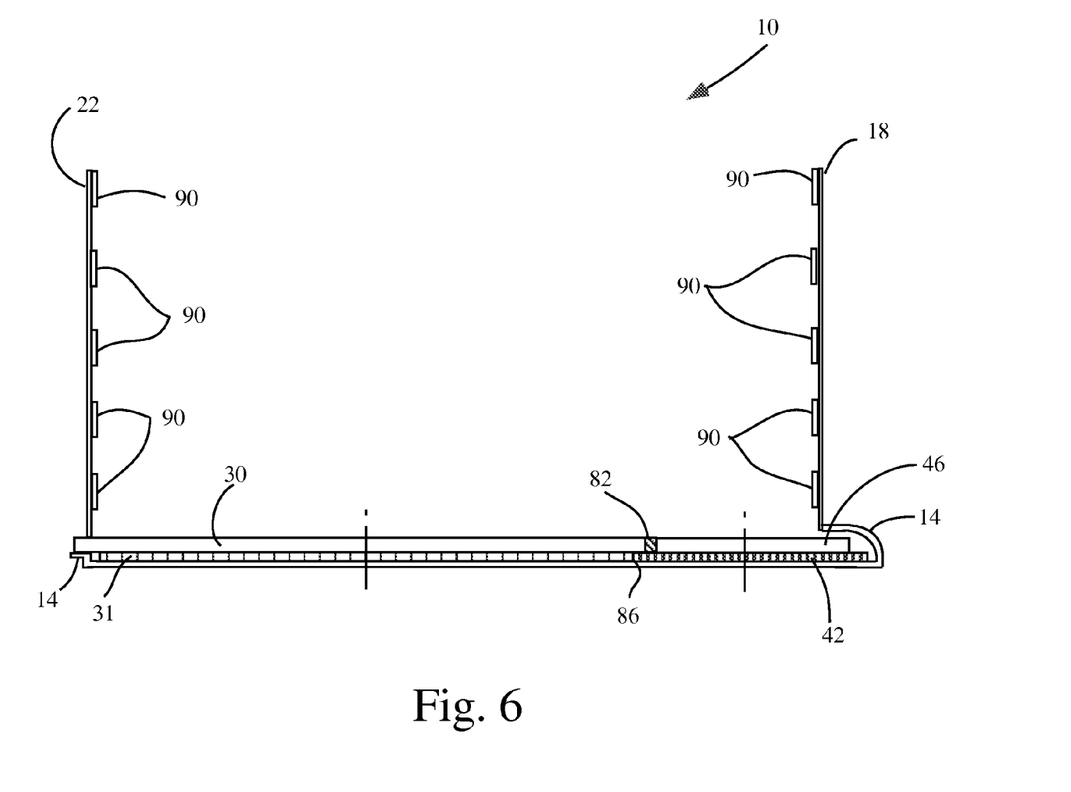
FIG. 6 is a cross-sectional view of the disclosed rotatable organizer from FIG. 5 through a different plane.

In this view, the base 14 is shown completely enclosing the turntables 46, 62. FIGS. 5 and 6 show how the exposed turntable 30 is exposed by the base 14. FIG. 4 shows the height "H" of the device. The organizer 10 may be any suitable height, dependent on the space restrictions of where the organizer will be placed. In one embodiment, the height H may be about 2 inches to about 10 inches, and preferably about 4.5 inches.

FIG. 5 shows a sectional view through plane identified as "FIG. 5" from FIG. 2 of the rotatable organizer 10. In this view, the base 14 is configured to allow a portion of the turntable 30 to be exposed, or viewable outside of the base 14. A portion of the low friction surface 82 is visible in this view between the exposed and third turntables 30, 54. The base 14, is shown enclosing the third turntable 54 and the third gear 50, however, the base 14 is shown leaving the exposed turntable 30 exposed, or visible from outside of the base 14.

FIG. 6 shows a sectional view through plane identified as "FIG. 6" from FIG. 2 of the rotatable organizer 10. In this view, it can be better seen how the exposed turntable 30 is located above and is connected to the first gear 31. Additionally, it can be seen how the exposed turntable 30 has a diameter that is greater than the first gear 31. Additionally, the second turntable 46 is also shown located above and attached to the second gear 42. Also, the diameter of the second turntable 46 is obviously smaller than the diameter of the second gear 42. The point of contact 86 between the first gear 31 and second gear 42 is shown. A portion of the non-stick surface 82 is shown between the exposed turntable 30 and the second turntable 46. The base 14, is shown enclosing the second turntable 46 and the second gear 42, however, the base 14 is shown leaving the exposed turntable 30 exposed, or visible from outside of the base 14. A portion of the rail 18 is shown attached to the base 14. A portion of the gate 22 is shown, however the attachment point between the gate 22 and the base 14 is not visible in this view. It should be noted that the gate 22, in other embodiments, may not be attached to the base 14 at all, but may only be attached to the rail 18. The rail 18 and gate 22 will have at least one inward surface 90, which faces towards the interior of the organizer 10. The inward surface 90 may have a low friction surface. The low friction surface may be selected from any suitable low friction surface, including, but not limited to: rubber, plastic, synthetic plastic, resins, polyvinyl, Teflon, nylon or metal.

Figure 7:
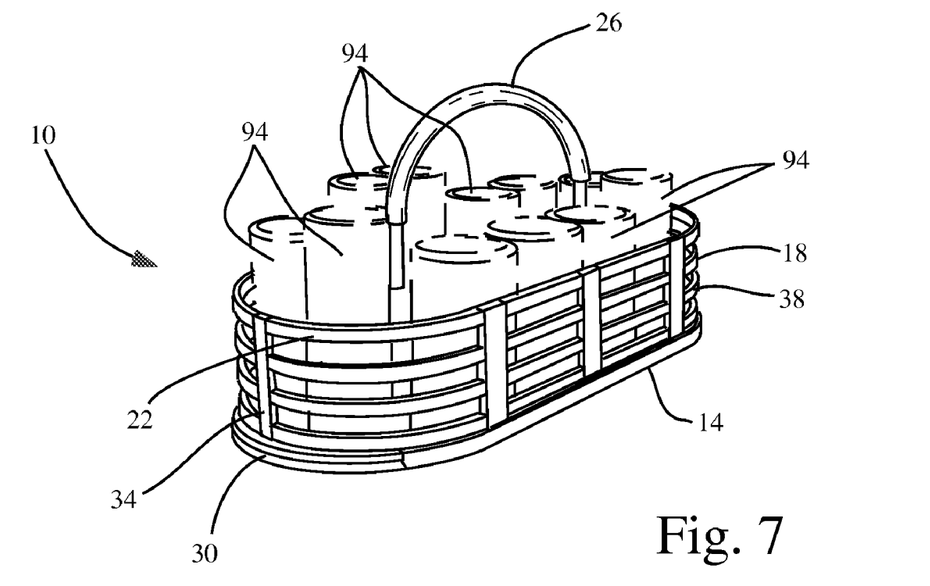
FIG. 7 is a perspective view of the disclosed rotatable organizer in use.
Figure 8:
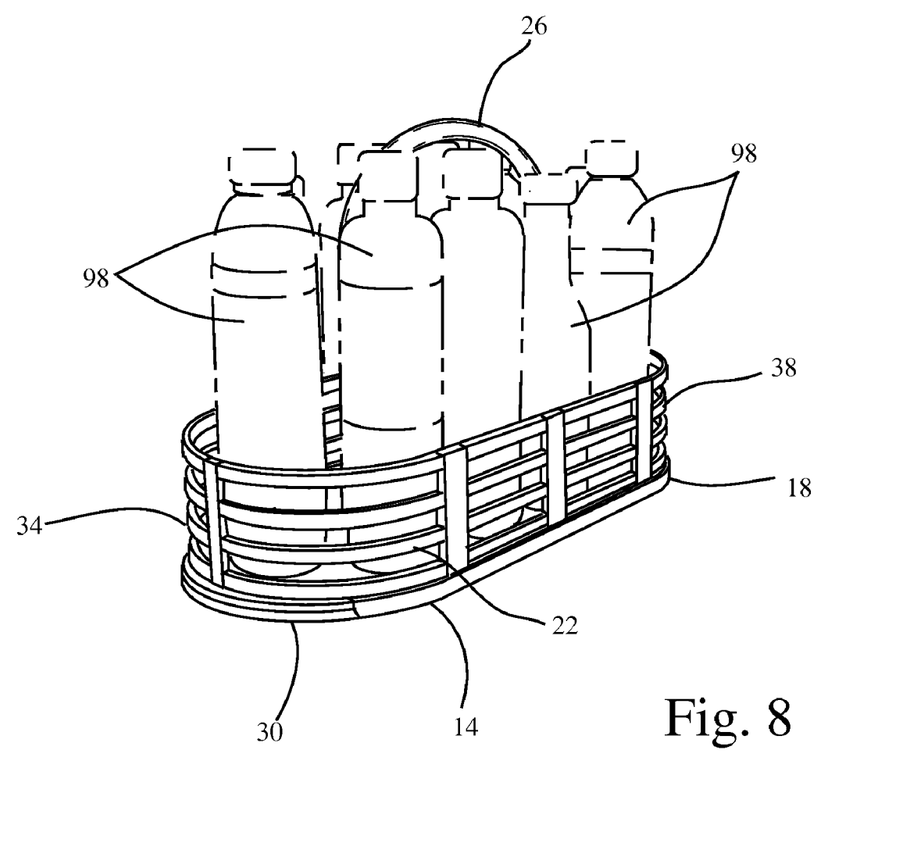
FIG. 8 is a perspective view of the disclosed rotatable organizer also in use.

FIG. 7 shows a perspective view of the rotatable organizer 10 with a variety of containers 94 stored in the organizer. In this view, the exposed turntable 30 is clearly visible and accessible as it extends out from the base 14. FIG. 8 shows a perspective view of the rotatable organizer 10 with a variety of bottles 98 stored in the organizer. It should be noted that any object that can fit in the organizer 10, may be stored in the organizer 10. Such objects include, but are not limited to: bottles, cans, boxes, packages, packets, etc.

Figure 9:
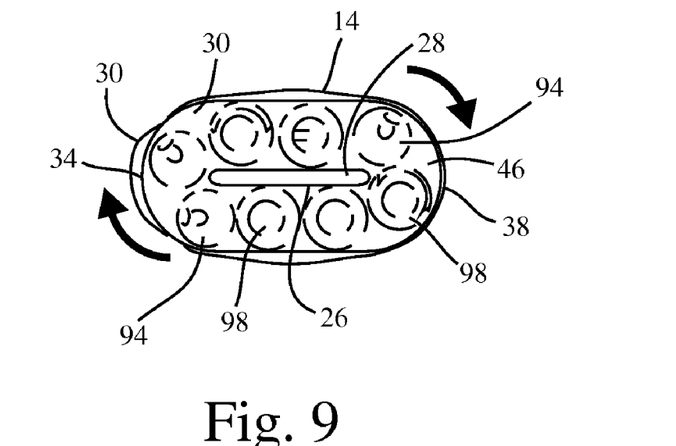
FIG. 9 is a top view of the disclosed rotatable organizer in use.

FIG. 9 shows a top view of the rotatable organizer 10 with several containers 94 and bottles 98 stored in the organizer 10. In this view, it can be seen that the exposed turntable 30 extends out from the base 14, allowing a user to manually turn the turntable 30. If a user turns the exposed turntable 30 in a clockwise direction (see the arrows), then both the exposed turntable 30 and third turntable 46, will rotate clockwise, causing the items (94, 98) sitting on the turntables 30, 46, to rotate about the central divider 28. Thus if a particular item, such as a container of pepper for example, is located near the 2nd end 38 of the organizer 10, the user simply rotates the exposed turntable 30 in either a clockwise or counterclockwise direction, causing the pepper container to rotate about the central divider, until the pepper container is near the first end 34, allowing for easy access to the pepper container by the user.

Figure 10:
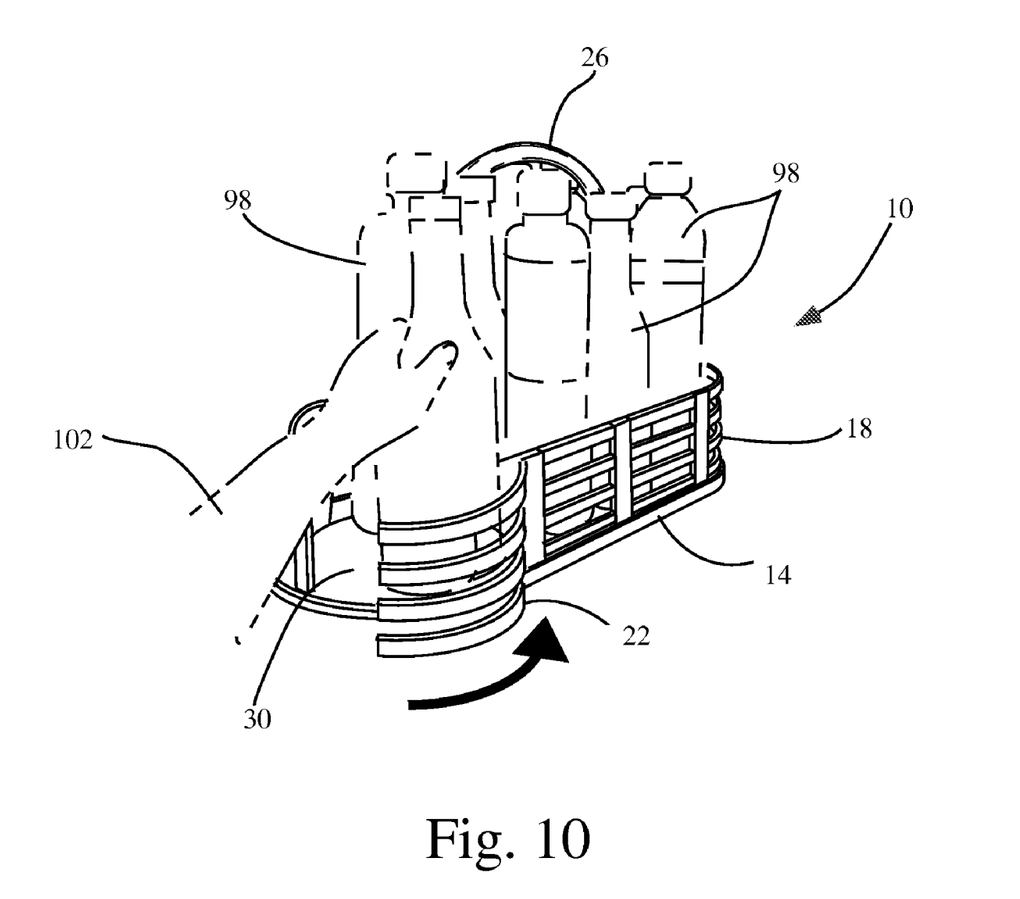
FIG. 10 is a perspective view of the disclosed rotatable organizer with the gate opened.

FIG. 10 shows the openable gate 22, being opened (in this embodiment the gate 22 is attached to the rail 18 via a hinge, however, other gate embodiments may be used, such as a sliding gate, a removable gate, etc. Thus, when the gate 22 is opened, a user 102 can easily reach into the organizer 10 and remove the item desired.

Figure 11:
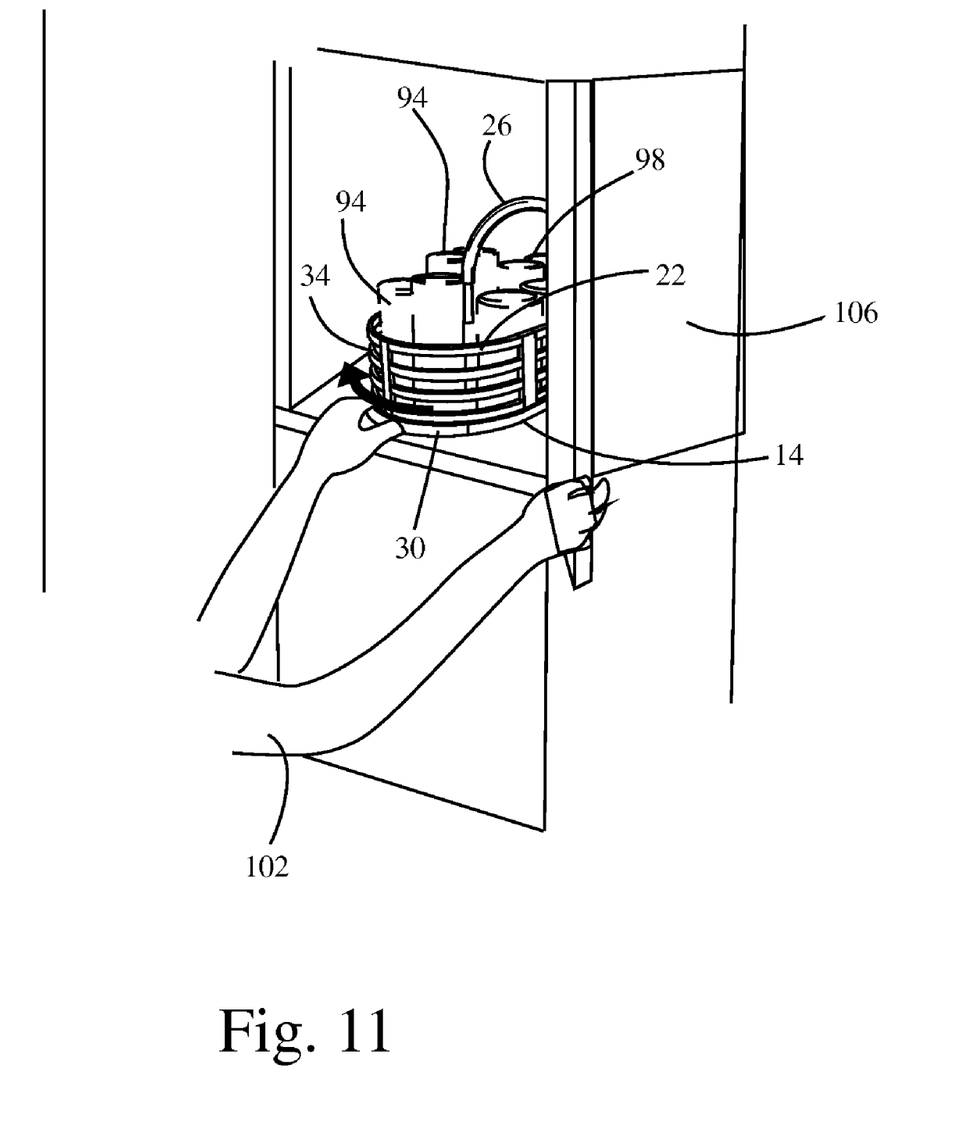
FIG. 11 is a perspective view of the disclosed rotatable organizer in a cabinet.

FIG. 11 shows a user 102 rotating the exposed turntable 30 in order to rotate the items (94, 98) in the organizer, until the desired item is accessible. This Figure shows how a relatively narrow and deep cabinet 106, is suitable for the generally oval or elliptically shaped organizer 10, which is longer than it is wide. The organizer 10 may be positioned in the cabinet with the front end 34 faxing the cabinet opening, thus allowing for a more efficient use of the cabinet space, especially compared to a round lazy susan.

Figure 12:
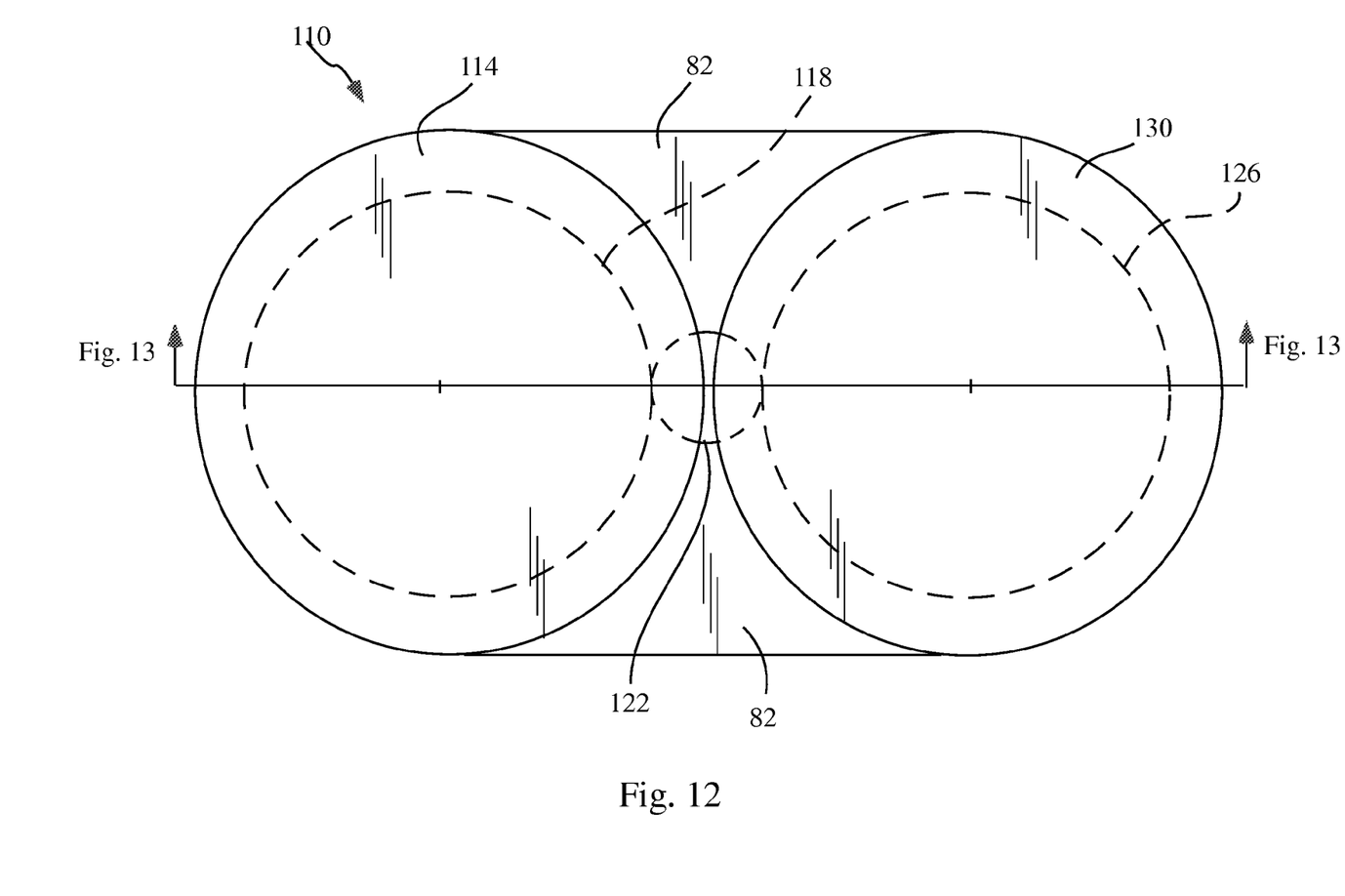
FIG. 12 is a top view of a three gear embodiment of the disclosed rotatable organizer.

FIG. 12 shows another embodiment of the rotatable organizer 110. In this embodiment an exposed turntable 114 has a first gear 118 attached to its bottom surface. The first gear 118 meshes with a middle gear 122. The middle gear 122 also meshes with a second gear 126. The second gear 126 is attached to the bottom surface of a second turntable 130. The base 14, gate 22 and rail 18, are not shown in this view for simplicity. Located between the exposed and second turntables 114, 130 is a low friction surface 82. Thus, it can be seen that when the exposed turntable 114 is turned in a clockwise direction, the first gear 118 also rotates in a clockwise direction, causing the middle gear 122 to turn in a counter-clockwise direction. Because the middle gear 122 turns in a counter-clockwise direction, the second gear 126 is forced to turn in a clockwise direction, thus causing the second turntable 130 to also turn in a clockwise direction. Similarly, when the exposed turntable 114 turns in a counter-clockwise direction, the second turntable 130 will also turn in a counter-clockwise direction. It should be noted that the middle gear 122 is not directly attached to a turntable, unlike the embodiment shown with respect to FIGS. 1 and 2. In this figure, the extendible handle 26, first pin member 27, second pin member 29, and central divider 28 are also not shown for clarity, however, they comprise this embodiment of the invention, in much the same way as shown in FIG. 1.

Figure 13:
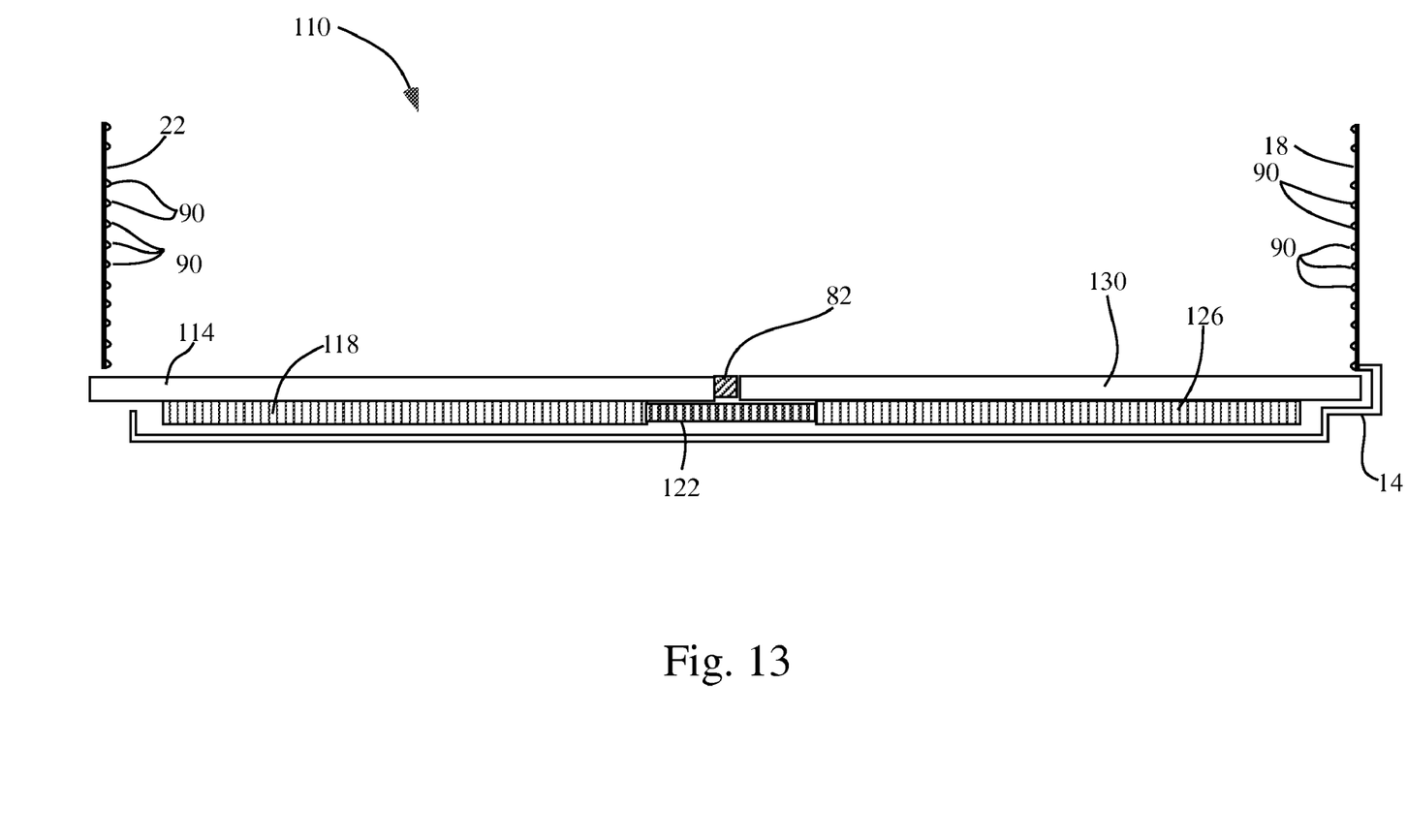
FIG. 13 is a cross-sectional view of the disclosed rotatable organizer from FIG. 12.

FIG. 13 shows a cross-sectional view of the rotatable organizer 110 from FIG. 12. In this view it can be seen how the exposed turntable 114 is visible and accessible due to the configuration of the base 14. Thus a user can simply turn the exposed turntable 114 by hand, in order to turn both the exposed turntable 113 and the second turntable 130. In this figure, the extendible handle 26, first pin member 27, second pin member 29, and central divider 28 are not shown for clarity, however, they comprise this embodiment of the invention, in much the same way as shown in FIG. 1.

Figure 14:
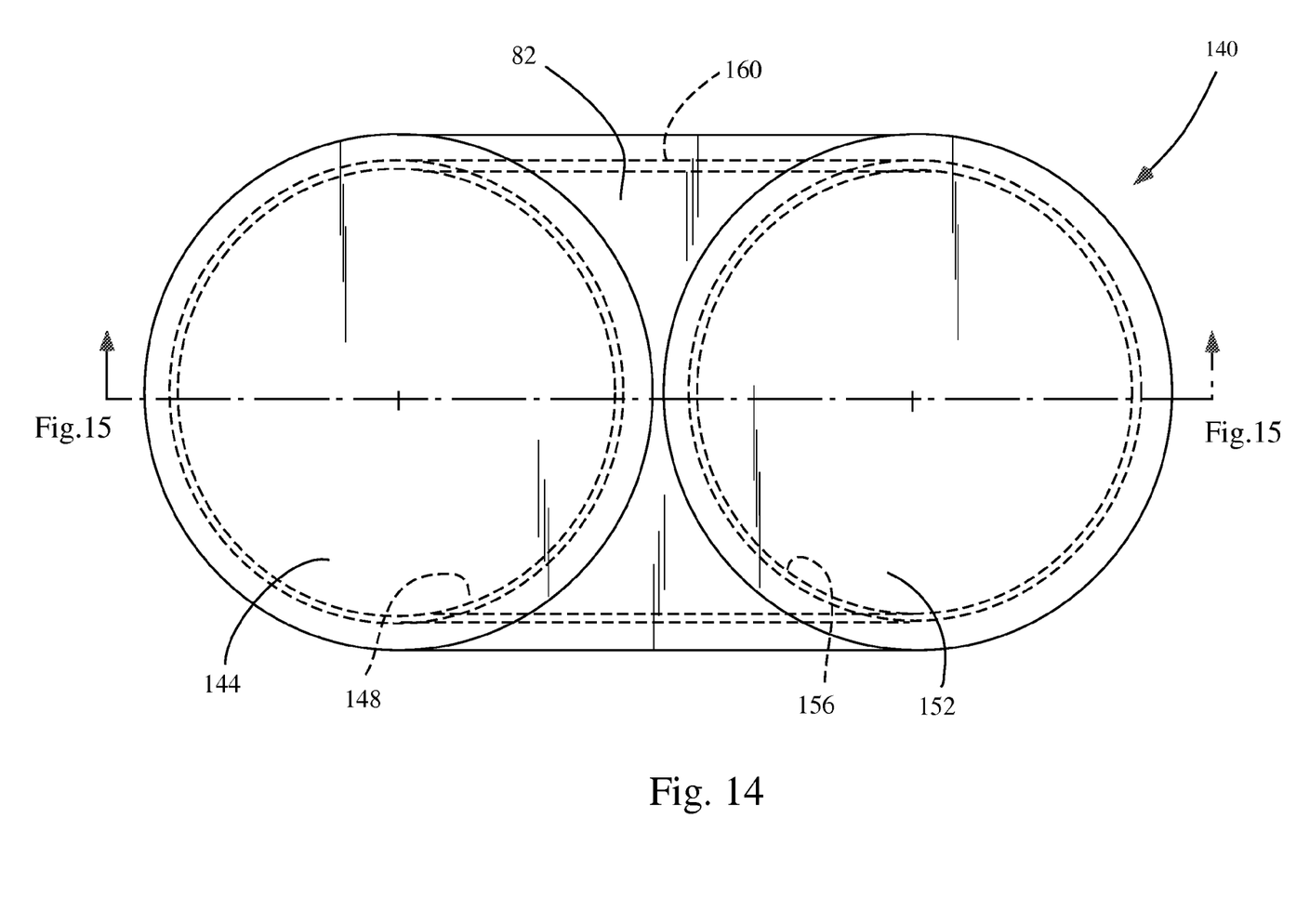
FIG. 14 is a top view of a belt embodiment of the disclosed rotatable organizer.

FIG. 14 shows another embodiment of the disclosed rotatable organizer 140. This embodiment 140 comprises an exposed turntable 144, that has a first grooved wheel 148 attached to its bottom surface, and a second turntable 152, with a second grooved wheel 156 attached to its bottom surface. A belt 160 rides in the groove of the first grooved wheel 148 and the groove of the second grooved wheel 156. When the exposed turntable 144 is turned in either a clockwise or counter-clockwise direction, the first grooved wheel 148 also turns in the same direction, causing the belt 160 to rotate in the same direction, which then causes the second grooved wheel 156 to turn in the same direction, and lastly the second turntable 152 will also turn in the same direction. The belt 160 may also include a wire, chain, strap, any other suitable belt like apparatus. In this figure, the extendible handle 26, first pin member 27, second pin member 29, and central divider 28 are not shown for clarity, however, they comprise this embodiment of the invention, in much the same way as shown in FIG. 1.

Figure 15:
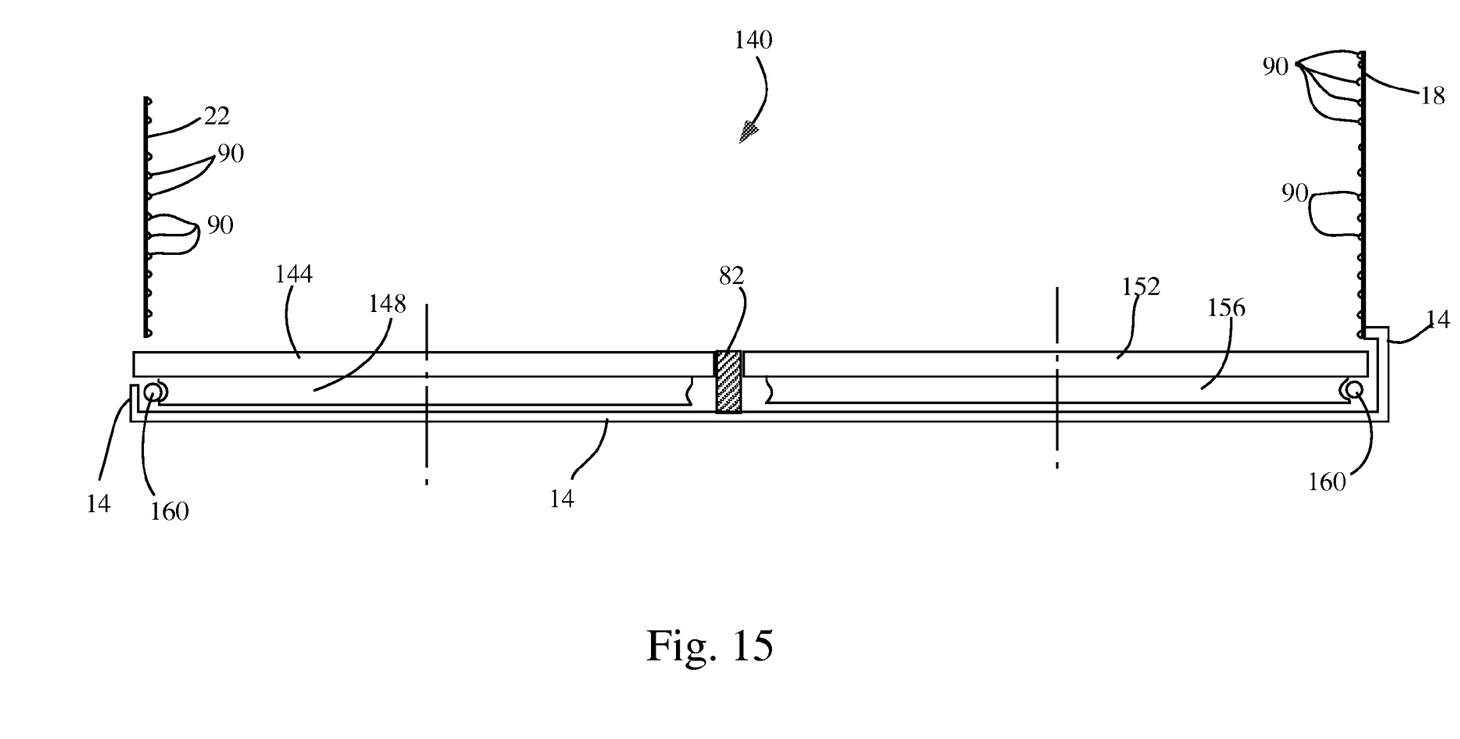
FIG. 15 is a cross-sectional view of the disclosed rotatable organizer from FIG. 14.

FIG. 15 shows a cross-sectional view of the disclosed rotatable organizer 140 from FIG. 14. In this view it can be seen how the exposed turntable 144 is visible and accessible due to the configuration of the base 14. In this figure, the extendible handle 26, first pin member 27, second pin member 29, and central divider 28 are not shown for clarity, however, they comprise this embodiment of the invention, in much the same way as shown in FIG. 1.

In still another embodiment, the turntables could rotate on rollers set around the perimeter of the organizer. In yet another embodiment, instead of using gears, wheels without teeth may be used, wherein the wheels transfer rotative motion to adjacent wheels through friction rather than through the meshing of gear teeth.

The disclosed rotatable organizer has many advantages. Because the disclosed rotatable organizer is elongated (e.g. not round), it will fit more efficiently within cabinet spaces, refrigerators, cupboards, etc. The disclosed rotatable organizer also has a gate and rail to keep the objects within the disclosed rotatable organizer. The disclosed rotatable organizer also has an exposed turntable to provide for easy turning of the items the disclosed rotatable organizer.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:
1. A rotatable organizer comprising:
a base;
a first gear in rotatable communication with the base;
an exposed turntable fixedly attached to the first gear, the exposed turntable having a center;

a second gear in rotatable communication with the base, and meshing with the first gear;

a third gear in rotatable communication with the base, and meshing with the second gear;

a second turntable fixedly attached to the third gear, the second turntable having a center;

a rail attached to the base and extending up orthogonally with respect to at least one of the turntables, and wherein the rail encloses a perimeter of the rotatable organizer;

a central divider located on a plane that contains an imaginary line that extends from the center of the exposed turntable to the center of the second turntable, the plane being generally orthogonal to the surface of the exposed turntable and the surface of the second turntable;

wherein the exposed turntable and the second turntable are configured to be rotatable with respect to the base.

2. The rotatable organizer of claim 1, wherein the rail comprises:

an openable gate.

3. The rotatable organizer of claim 1, further comprising:

a first pin member rotatably attached to the center of the exposed turntable;

a second pin member rotatably attached to the center of the second turntable; and wherein the central divider is attached to the first and second pin members.

4. The rotatable organizer of claim 1, wherein the length of the organizer is at least twice the width of the rotatable organizer.

5. The rotatable organizer of claim 1, further comprising:

a fourth gear in rotatable communication with the base;

a fourth turntable fixedly attached to the fourth gear.

6. The rotatable organizer of claim 1, further comprising:

a third fixedly attached to the second gear.

7. The rotatable organizer of claim 3, further comprising:

an extendible handle attached to the first pin member and the second pin member.

8. The rotatable organizer of claim 1, further comprising:

a non-stick surface coplanar with the exposed turntable, the second turntable, the non-stick surface abutting the exposed turntable and the second turntable, and filing in the perimeter where a turntable surface is not located.

9. The rotatable organizer of claim 8, wherein the central divider is attached to the non-stick surface.

10. The rotatable organizer of claim 1, further comprising:

at least one non-stick inward surface located on the rail;

at least one non-stick inward surface located on the openable gate.

11. The rotatable organizer of claim 1, wherein the rail encloses the entire perimeter of the rotatable organizer.

12. The rotatable organizer of claim 1, wherein the rail comprises:

an opening in the rail configured to allow for access to items located in the rotatable organizer.

* * * * *